United States Patent
Antonuccio et al.

[11] Patent Number: 5,867,369
[45] Date of Patent: Feb. 2, 1999

[54] RUGGED COMPUTER HOUSING

[75] Inventors: Robert Salvatore Antonuccio, Burlington, Mass.; Thomas E. Stewart, Los Altos, Calif.; Joseph M. Spano, North Reading; Mathew John Palazola, Glochester, both of Mass.; William Anthony Izzicupo, Windham, N.H.; James Maurice Carney, Pepperell, Mass.; Daniel Derrick Gonsalves, Hudson, N.H.; Mark Richard Pugliese, Schrewsbury, Mass.

[73] Assignee: Sun Microsystems, Inc., Palo Alto, Calif.

[21] Appl. No.: 892,929

[22] Filed: Jul. 15, 1997

[51] Int. Cl.⁶ .................................................. H05K 7/14
[52] U.S. Cl. ...................... 361/796; 361/748; 312/223.2
[58] Field of Search .................................... 361/683, 724, 361/748, 753, 796, 797, 800, 801; 312/223.1, 223.2; 211/41.17; 174/35 GC, 50, 52.1

[56] References Cited

U.S. PATENT DOCUMENTS

| | | | |
|---|---|---|---|
| 4,728,160 | 3/1988 | Mondor et al. | 312/236 |
| 5,031,070 | 7/1991 | Hsu | 361/683 |
| 5,040,161 | 8/1991 | Jones et al. | 369/75.1 |
| 5,271,152 | 12/1993 | Murphy | 29/830 |
| 5,349,132 | 9/1994 | Miller et al. | 174/35 R |
| 5,604,662 | 2/1997 | Anderson et al. | 361/685 |
| 5,680,295 | 10/1997 | Le et al. | 361/695 |

*Primary Examiner*—Lynn D. Feild
*Assistant Examiner*—Jayprakash N. Gandhi
*Attorney, Agent, or Firm*—Peninsula Law Group; Daniel Hopen; Kevin Fortin

[57] ABSTRACT

A composite computer housing protects electronic components against shock and vibration. The housing has a midplane which divides the housing into a chassis section and a mainboard section. The chassis section holds hard disk drives. The mainboard section holds a mainboard, cards, a processor unit and other electronic components. A composite side cover assembly, having multiple layers, encloses the housing and provides a shell to inhibit flexion of the housing. The side cover presses against any number of the electronic components in the mainboard section to minimize vibration of these components and to enable the electronic components to provide internal support to the housing.

7 Claims, 8 Drawing Sheets

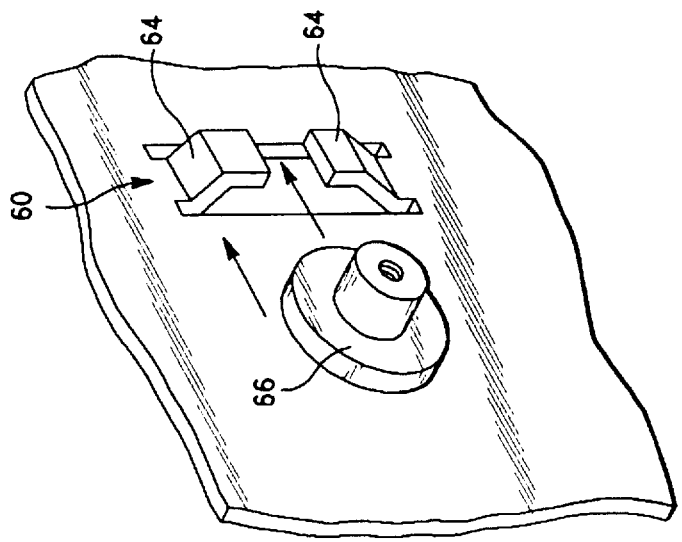
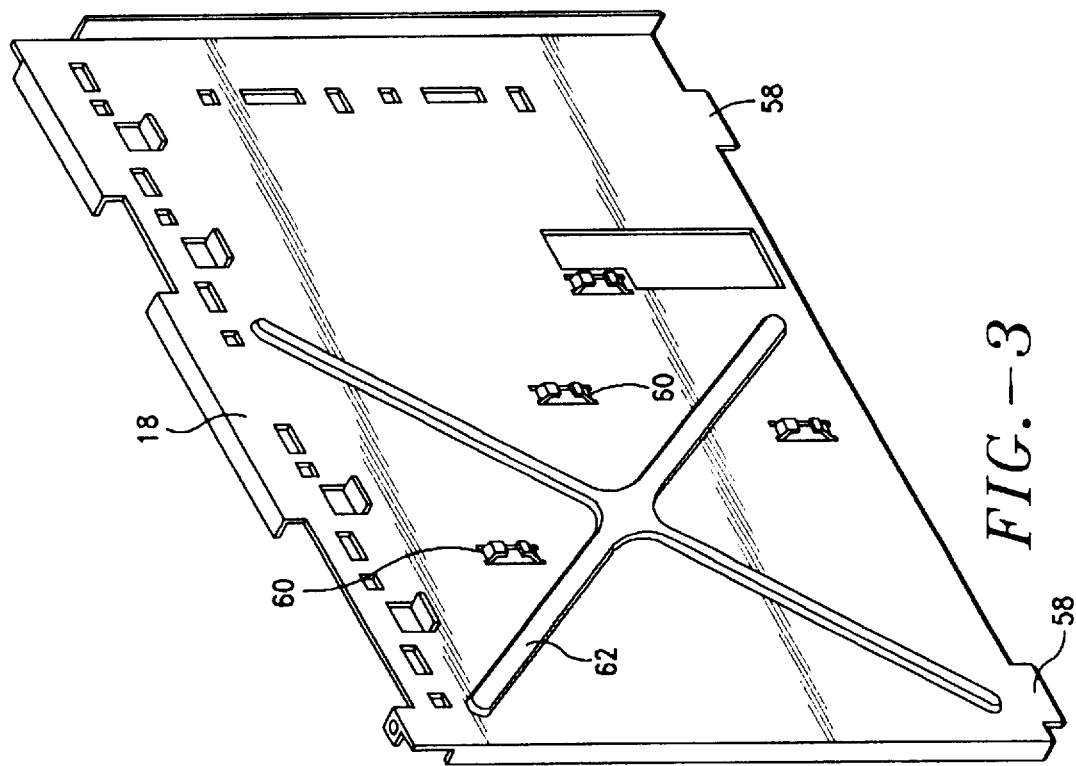
FIG.-4
FIG.-3

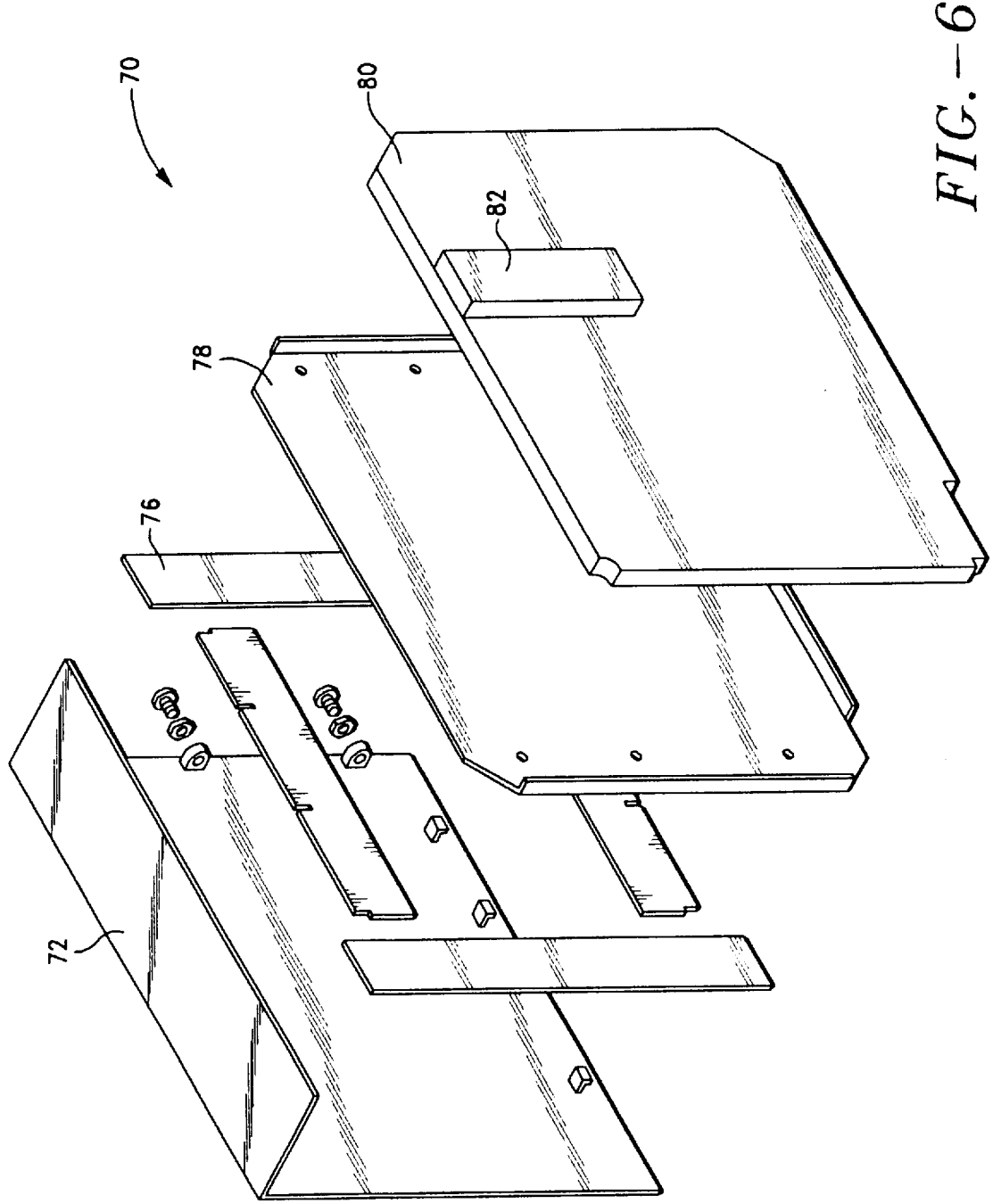

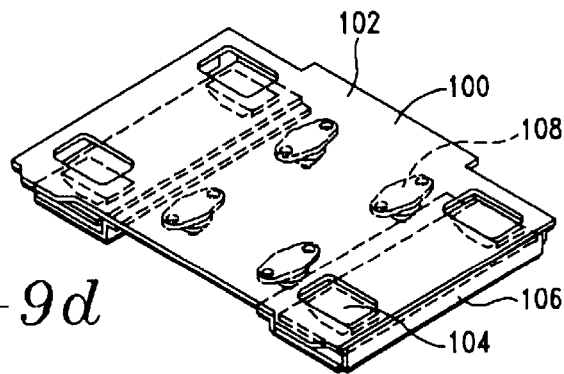
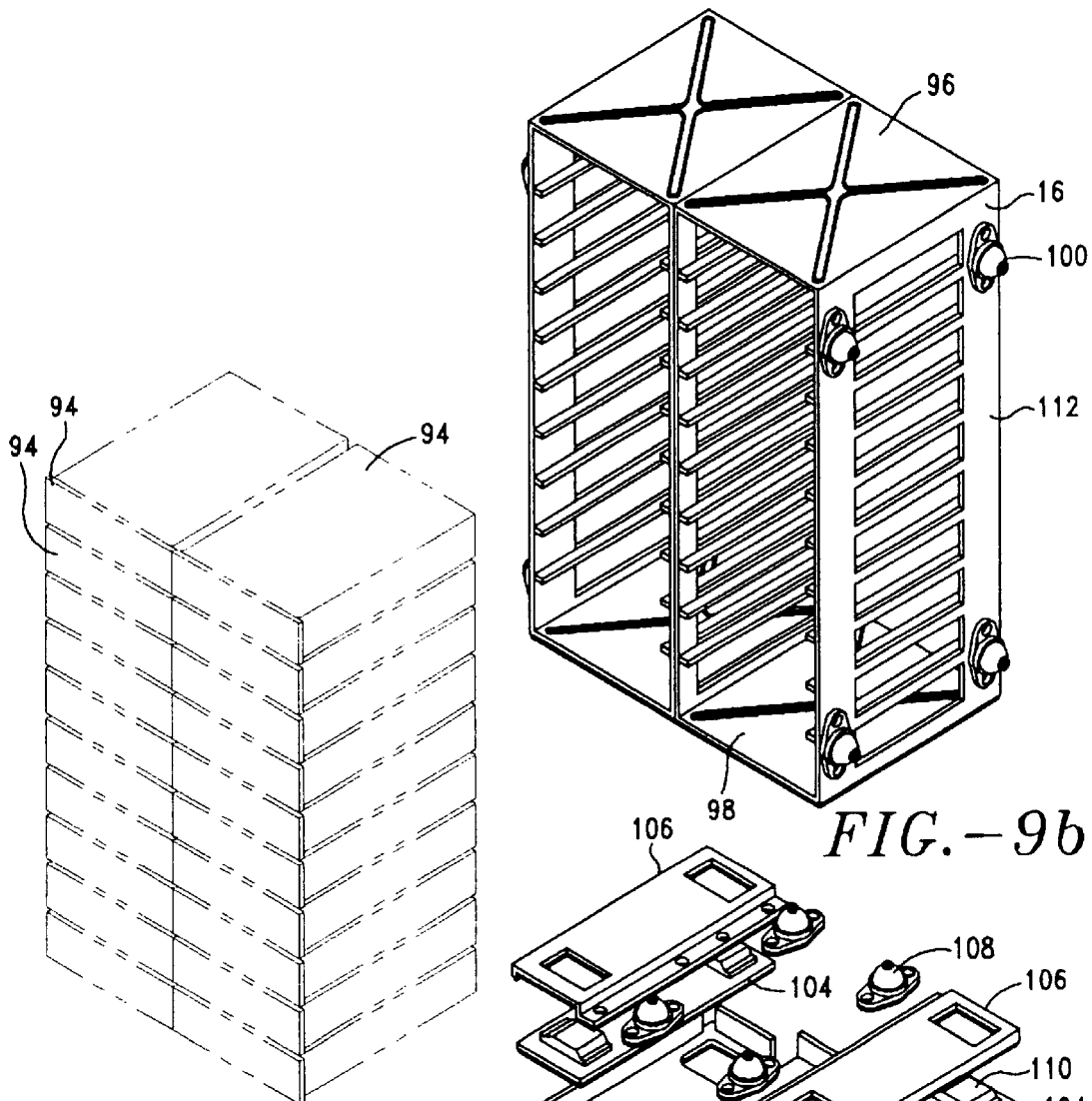
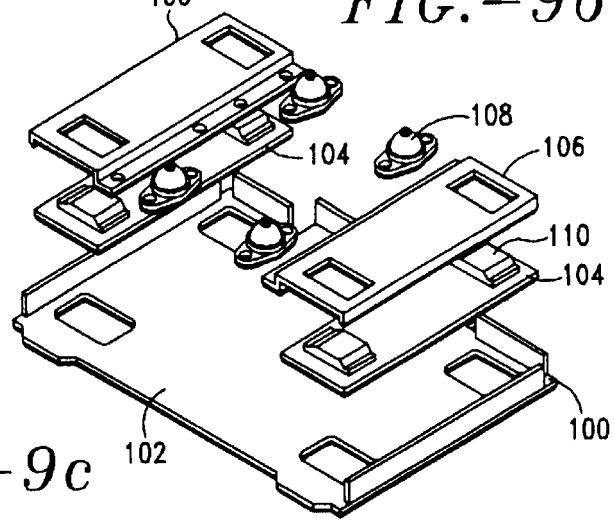
FIG.–9d
FIG.–9b
FIG.–9a
FIG.–9c

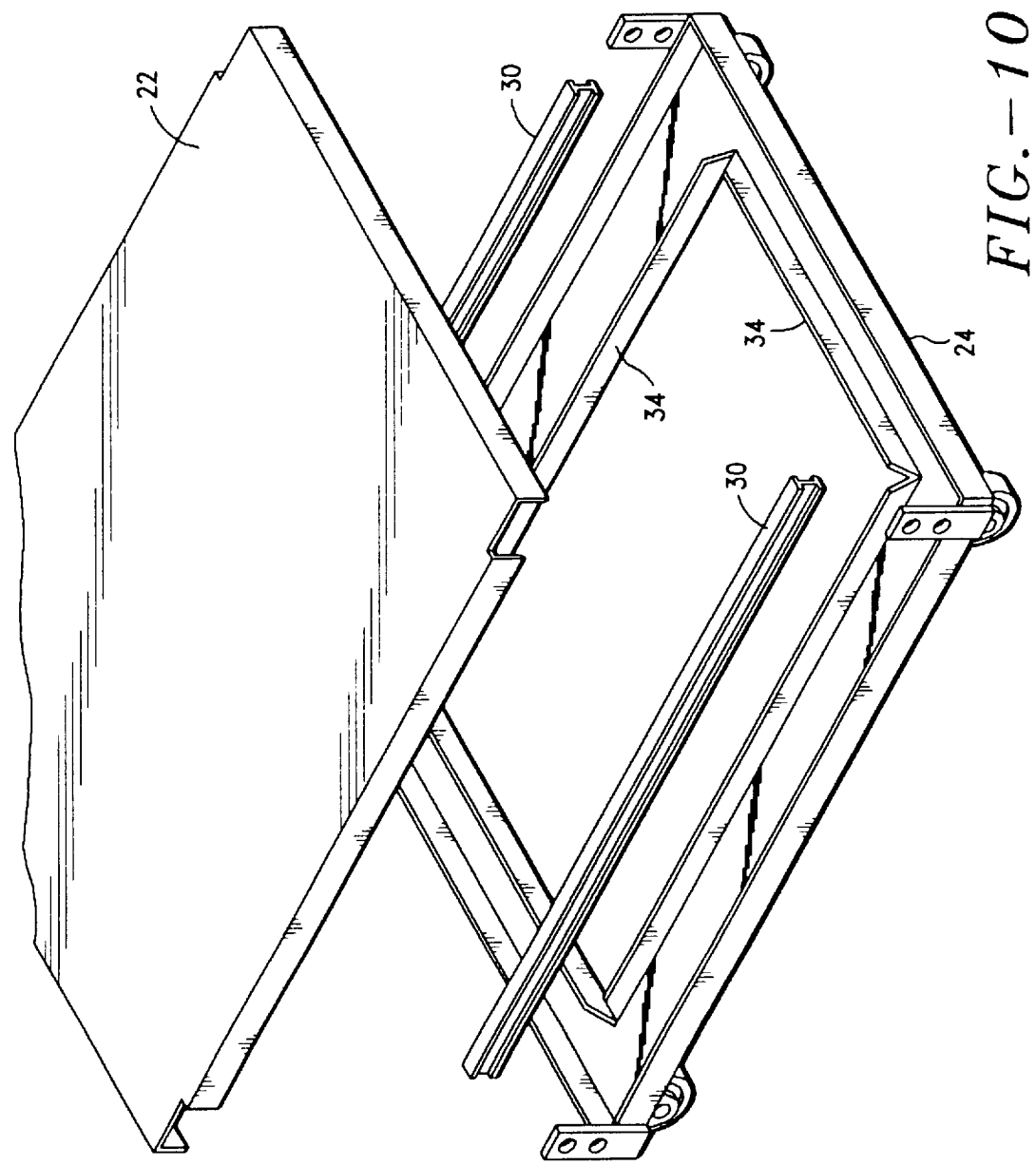

RUGGED COMPUTER HOUSING

TECHNICAL FIELD OF THE INVENTION

This invention relates to computer housings and more particularly to computer housings which resist shock and vibration.

BACKGROUND AND RELATED ART

Computer system electronic components include mainboards, daughter boards, processors, cards, and various other modules. It can be appreciated that shock and vibration can damage such system components.

Vibrations may cause system failure in a number of ways. Vibration may fatigue electronic components, causing failure. Vibrations may also loosen connections between electronic components, making the computer system more likely to malfunction. Vibrations experienced by a typical computer system include vibration caused by hard disk drives. These vibrations are caused by the rotating disk drive platter and tend to be relatively high in frequency. Moreover vibrations can be amplified in systems having a number of disk drives operating simultaneously. Worn or damaged disk drive bearings are another source of undesired vibration. These and other vibrations can shake apart solder joints and may fatigue computer system components.

Shock is another adverse condition that can cause the computer system to malfunction. Sudden shock may be caused by impact between the computer housing and another object, for example. Sudden shock may flex the housing, or cause the electronic components to shift, causing damage to the electronic components.

During a sudden shock such as from an impact, the computer housing will flex. Flexion of the housing is a concern because such flexion may, in turn, deform the electronic components causing damage or misalignment of connected components including the mainboard. Flexion of the mainboard is particularly troublesome because such flexion may damage not only the mainboard, but may also the various components which attach to the mainboard, and connections between these components. There are numerous other ways in which shock may adversely effect electronic components.

The magnitude of any shock or vibration is not always indicative of the amount of damage the shock or vibration inflicts. Other factors influence the amount of damage. These factors include how the shock or vibration resonates. A computer housing may magnified and/or dampened any particular the shock or vibration depending on the shape and structure of the housing.

The frequency of shock or vibration also influences the extent that shock or vibration will damage a system. A high frequency vibration, commonly generated by disk drives, may damage other electronic components. Sudden shock from impact may damage the disk drives. Dampening high frequency vibrations, however, may not significantly dampen low frequency impacts. Both high and lower frequency vibrations in a computer housing should be dampened by the housing.

Some computer systems have casters. Casters enable people to more easily move the computer system within a room, between rooms, or even between buildings. Casters, however, may increase the probability that any particular computer system will be moved—raising the likelihood that the system will endure impact. Impact with door jams, walls, and even the knee of a passerby is more likely when a system is moved. Furthermore, casters may communicate undesired vibrations to the computer housing during movement of the computer system. Such impacts often cause a sensitive electronic component to loosen or break. Vibrations due to movement over a rough surface (i.e. parking lot) may also cause component failure.

Therefore, it is desirable to provide a computer housing which is resists impact and which dampens high frequency vibrations. It is also desirable to provide a rugged computer system having casters so that the system is moveable without seriously risking computer system failure.

SUMMARY OF THE INVENTION

The present invention provides a rugged computer system and housing. The housing includes a base assembly with casters, a chassis assembly for holding hard disk drives, a midplane for isolating the hard disk drives and a side cover assembly. The chassis assembly isolates hard disk drives from the computer housing to dampen vibrations. The midplane, the base assembly, and the side cover assembly cooperate compositely to reduce flexion of the housing and thereby reduce damage due to impact.

The base assembly has a top face and a bottom face which form a box beam. The box beam extends peripherally around the base assembly and reinforces the base assembly near the casters so that the base assembly may be rolled on the casters without flexing the base assembly and the housing.

The chassis assembly mounts on the base assembly and includes an isolation mount. The isolation mount attaches the chassis assembly to the base assembly so that the isolation mount dampens shock and vibrations between the base assembly and the chassis assembly. This protects electronic components in the housing from vibrations from the disk drives. The isolation mount also protects the disk drives from impact experienced by the casters.

The midplane attaches to the base assembly and defines a mainboard section of the housing. The midplane functions to isolate the mainboard section from the chassis assembly and to internally support the housing. This internal support is provided in several ways including support in cooperation with the side cover assembly.

The side cover assembly mounts on the base for enclosing the chassis assembly and the mainboard section. The side cover includes an outer cover, a gasket, and a rigid inner member which cooperate to externally support the housing. The side cover presses electronic components against the midplane so that composite cooperation between the midplane, the side cover and the electronic components internally supports the housing.

A computer system and housing are provided which integrates the base, midplane and side cover assembly so that the housing resists flexion and thereby protects electronic components from shock. The chassis assembly isolates disk drives to minimize communication of high frequency vibrations. These features and other aspects of the invention result in a rugged computer housing. The various other aspects and advantages of the present invention can be seen upon review of the figures, the detailed description and the claims which follow.

BRIEF DESCRIPTION OF THE DRAWINGS

For a further understanding of the objects and advantages of the present invention, reference should be had to the following detailed description, taken in conjunction with the accompanying drawing, in which like parts are given like reference numerals and wherein:

FIG. 3 is an exploded perspective view of a midplane.

FIG. 4 is a an enlarged perspective view of a mainboard mount of FIG. 3.

FIG. 6 is a perspective view of a portion of the side cover assembly.

FIG. 9a shows multiple memory storage devices.

FIG. 9b shows the chassis assembly in accordance with the present invention.

FIG. 9c shows an isolation mount for the chassis assembly of FIG. 9b.

FIG. 9d shows a top isolation mount of the chassis assembly of FIG. 9b.

FIG. 10 shows a base assembly in accordance with the present invention.

DETAILED DESCRIPTION

Figure 1:
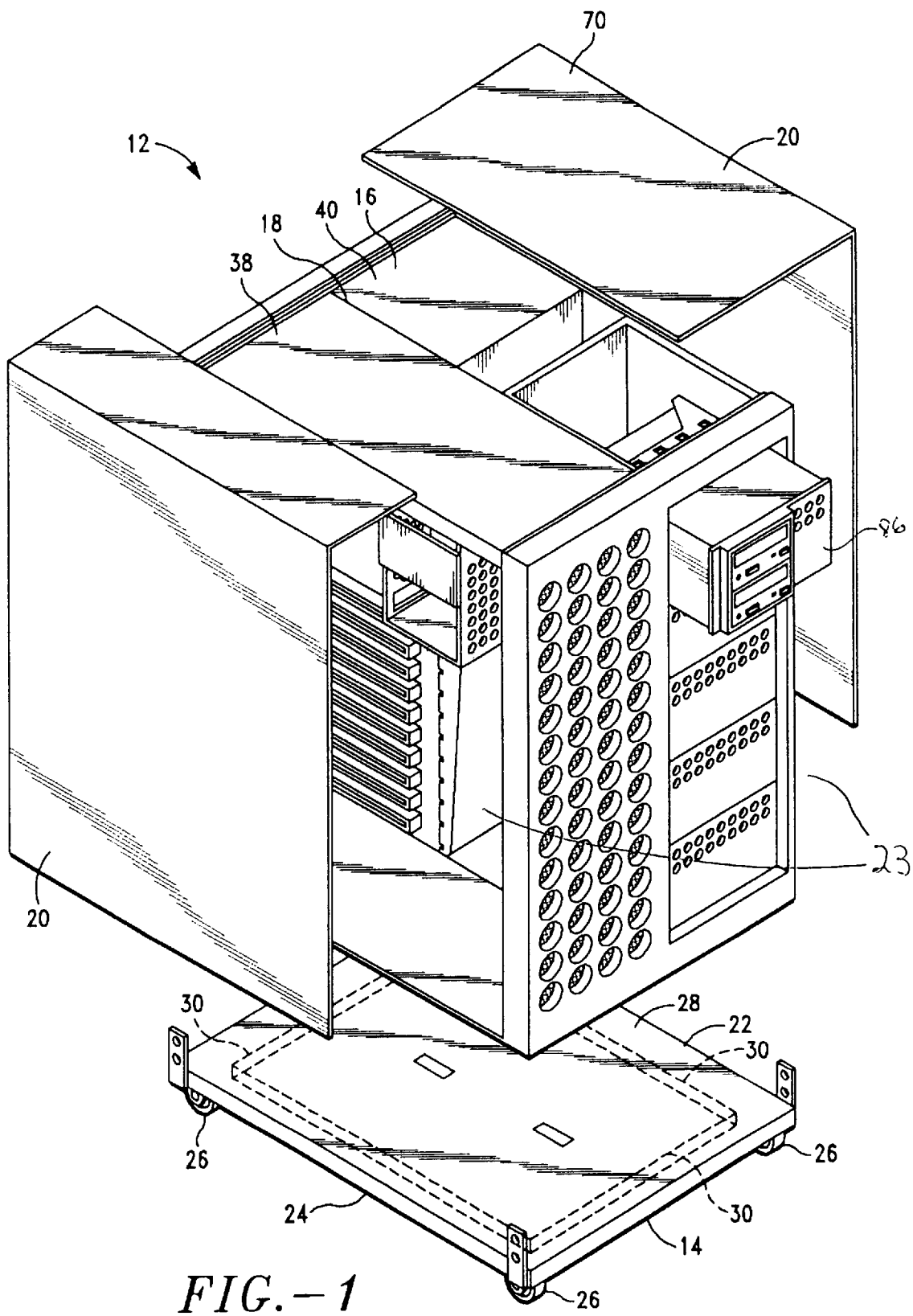
FIG. 1 is a partially exploded perspective view of a computer housing in accordance with the present invention.

FIG. 1 shows a computer housing for protecting electronic components against shock and vibration, generally designated with the reference numeral 12. The housing 12 includes a base assembly 14, a chassis assembly 16, a midplane 18 and a side cover assembly 70 having a pair of side covers 20. The midplane 18 divides the computer housing 12 into a mainboard section 38 and a chassis section 40.

The base assembly 14 includes a top face 22, a bottom face 24 and a plurality of casters 26. The casters 26 attach to the bottom face 24 to enable the computer housing 12 to roll. The top face 22 and the bottom face 24 mate to form a box beam 28. The box beam 28 includes reinforcing members 30 which define a portion of the box beam 28 and extend with the box beam 28 to provide rigidity to the base. The casters 26 attach to the bottom face 24, under the box beam 28.

It can be appreciated that when the computer housing 12 rolls on the casters 26, the casters 26 may hit an obstacle such as a door jam, power cord, etc. The box beam 28 reinforces the computer housing 12 to support the casters 26. The box beam 28 enables the computer hosing 12 to resist vibrations due to impact. Reinforcing the computer housing 12 with the box beam 28 also enables the base assembly 14 and the computer housing 12 to resist deformation, to protect the various electronic components within the computer housing 12.

Excessive computer housing 12 weight may add stress to the connection between the casters 26 and the base and may increase the likelihood of deforming the base and the computer housing 12. The box beam minimizes computer housing 12 weight by providing structural support above the casters 26, where support is needed.

The midplane 18 extends outward from the base assembly 14 to separate the computer housing 12 in to at least two sections. Preferably, the midplane 18 defines a chassis section 40 and a mainboard section 38. The midplane 18 cooperates with the base assembly 14 to add rigidity to the housing 12 and to inhibit deformation of the housing 12 due to shock and vibration.

The midplane 18 isolates the chassis section from the mainboard section. Components, such as disk drives, held in the chassis section 40 are thus isolated from the mainboard section 38. Isolation of components inhibits damage to mainboard section 38 components by chassis assembly 16 components due to vibration.

The chassis section 40 includes a chassis assembly 16. The chassis assembly 16 is isolated as a unit from the remainder of the housing 12 to filter shock and vibration between the chassis assembly 16 and the remainder of the housing 12. The chassis assembly 16 includes multiple memory storage device units including a removable storage device module and multiple hard disk drives. The removable memory storage device module includes optical disk drives. It can be appreciated, however, that any of a number of memory storage deices may be used in accordance with the present invention.

The housing 12 has opposing sides with side openings 23. The side cover assembly 70 includes a pair of side covers 20 which removeably cover opposing sides and cover the side openings 23 of the computer housing 12. The side covers 20 are formed, in part, from molded plastic to resist vibrations. The plastic material causes the side covers to be lightweight and easily removable to enable access to the electrical components by a technician, for example.

According to a preferred embodiment, both side covers 20 have a generally "L" shaped cross-section. Each side cover 20 has a top portion. The top portion of each side cover 20 rests on the computer housing 12 to support weight including accessories, or even a seated person.

Figure 2:
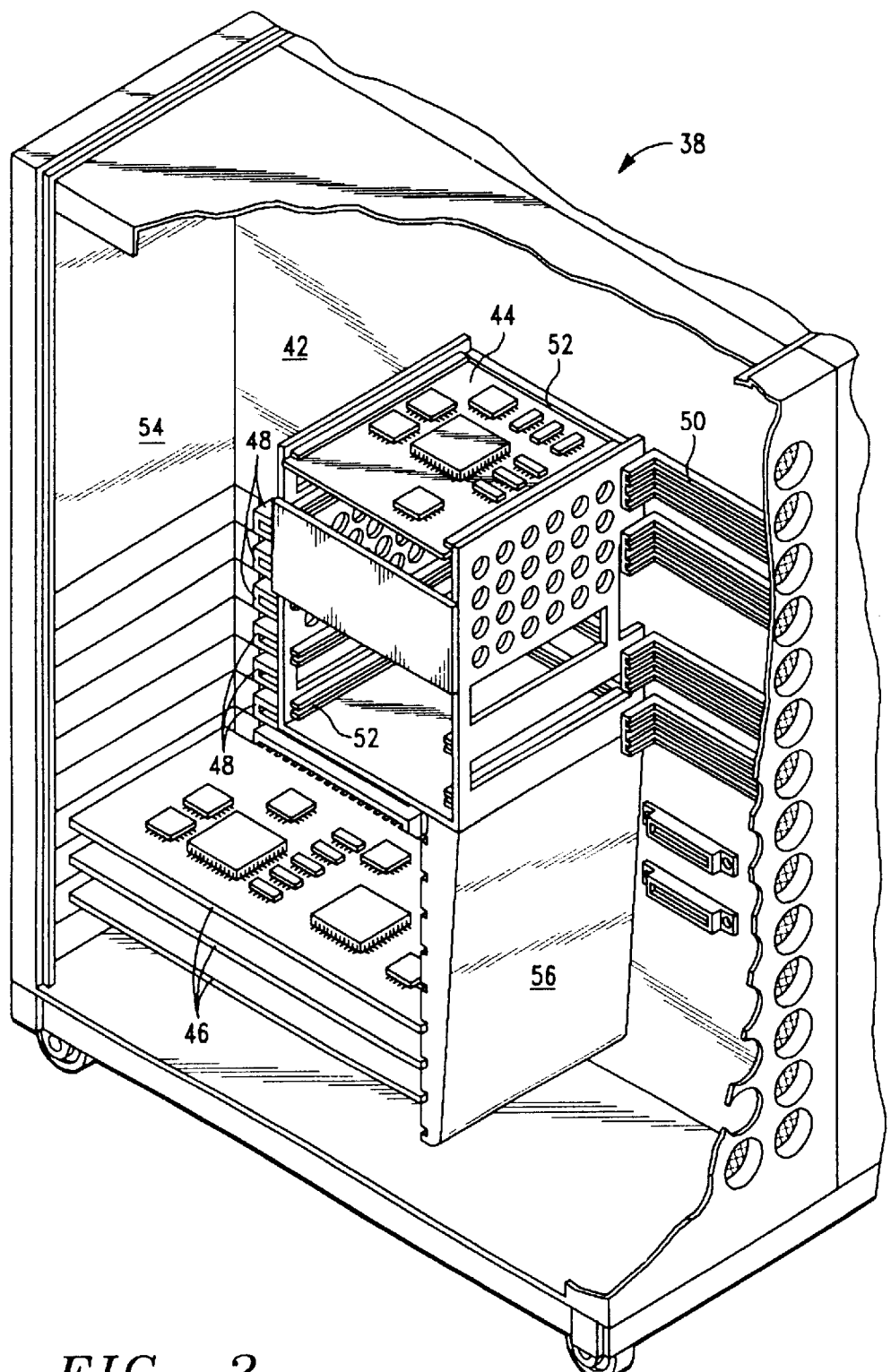
FIG. 2 is a partial perspective view of a portion of the computer housing of FIG. 1.

FIG. 2 shows the mainboard section 38. The mainboard section 38 houses electronic components including a mainboard 42, at least one processor unit 44, and multiple cards 46. The mainboard 42 includes card slots 48, memory slots 50 and processor unit slots 52 for receiving cards 46, memory modules and the processor unit 44, respectively. The processor unit 44 and the cards 46 extend perpendicularly from the mainboard 42 so that when the side covers 20 attach to the housing 12, the side covers press against the processor unit 44 and the cards 46 to internally support the computer housing 12 (FIG. 1).

The cards 46 are rectangular, having four sides. The mainboard section 38 has a rear 54 and a retainer 56. The cards 46 are held on one side by the rear 54 of the housing 12, on another side by the card slot 48 and on a third side by a retainer 56.

FIG. 3 shows an embodiment of the midplane 18. The midplane 18 includes extensions 58 for mounting the midplane 18 into the base (FIG. 1). The midplane 18 also includes several mainboard mounts 60 and a cross-rib 62. The extensions insert into the base assembly 14 (FIG. 1) to hold the midplane 18. The midplane 18 adds rigidity to the housing 12 and isolates the chassis section 40 from the mainboard section 38.

The cross rib 62 is stamped into the midplane 18 and includes contours which inhibit flexion of the midplane 18. Inhibiting flexion of the midplane 18 minimizes flexion of the computer housing 12, the mainboard and the other electronic components. This makes the computer housing 12 more rugged in the face of shock and vibration. Increased ruggedness of the housing 12 makes the computer system and electronic components more reliable.

FIG. 4 shows a mainboard mount 60. The mainboard mount 60 includes two fingers 64 which are formed integral with the midplane 18. The fingers 64 are separated, and angled towards each other. The separated and angled configuration of the fingers 64 enables the fingers 64 to grip a resilient spacer mount 66. The resilient spacer mount 66 is threaded to screw tightly to a mainboard and attach a mainboard to the midplane 18 (FIG. 3). The resilient spacer mount 66 dampens shock and vibration between the mainboard and the midplane 18.

Figure 5:
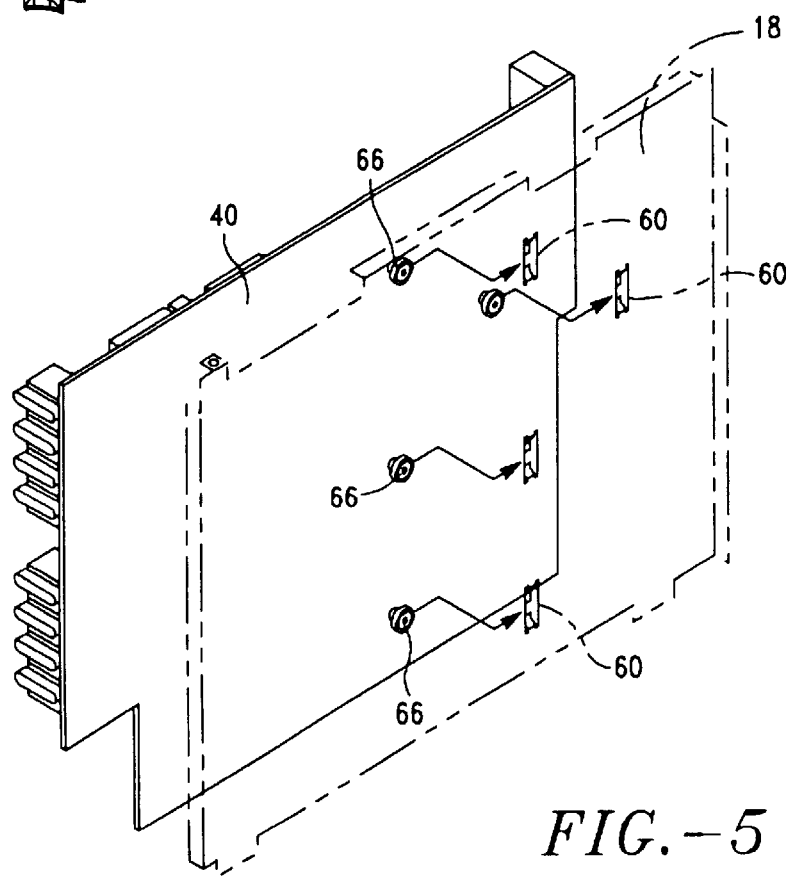
FIG. 5 is a perspective view of a mainboard attaching to a midplane.

FIG. 5 shows several resilient spacer mounts 66 affixed to the mainboard 42. The resilient spacer mounts 66 coincide with the mainboard mounts 60 on the midplane 18. Accordingly, the mainboard 42 slides in the direction of the arrows to mate the resilient spacer mounts into the mainboard mounts. This mating arrangement between the spacer mounts 66 and the mainboard 42 holds the mainboard and dampens vibration and shock.

FIG. 6 shows an exploded view of an embodiment of the side cover assembly, generally designated with the reference numeral 70. The side cover assembly 70 is a composite, being formed from a number of integrated elements. In particular, the composite side cover assembly 70 includes an outer cover 72 having a periphery 74, a gasket 76 attached within the periphery, an inner member 78 and a pad 80.

The inner member 78 attaches to the outer cover 72 and compresses the gasket 76 between the outer cover 72 and the inner member 78. The inner member 78 is rigid to stiffen the side cover assembly 70. The gasket 76 dampens vibrations between the inner member 78 and the outer cover 72. The pad 80 dampens vibrations between the side cover assembly 70 and the electronic components including cards 42 and the processor unit 44 (FIG. 2).

The outer cover 72, the gasket 76, the inner member 78 and the pad 80 function as a single unit (compositely) to encase the housing 12. Encasement of the housing 12 creates an outer shell which inhibits flexion of the housing 12 when the side cover assembly attaches to the computer housing 12.

The side cover assembly 70, in addition to encasing the housing 12, also provides internal support to the housing 12 (FIG. 1). Internal support results when the side cover assembly 70 presses against the main board 42 to hold the mainboard 42, the cards 46 and the processor unit 44 and protect them against shock and vibration. Encasement and internal support provided by the side cover assembly 70 provides rigidity to the computer housing 12.

The inner member 78 is fabricated from steel sheet metal to shield electro-magnetic energy. The inner member also stiffens the side cover.

The gasket 76 is fabricated in four pieces from sponge urethane rubber to enable the side cover assembly 70 to press fit against with the computer housing 12 side openings and thereby enable the composite side cover assembly to structurally reinforce the housing 12.

The pad 80 attaches to the inner member 78. The pad 80 is fabricated from resilient foam and includes a contoured portion 82. The contoured portion 82 of the pad 80 is rectangular shape and coincides with the location of the processor unit 44 (FIG. 2) when the side cover assembly covers the computer housing 12. Accordingly, the contour of the pad presses against the processor unit to restrain the processor unit and to secure the side cover assembly against the housing 12. Restraining the processor unit 44 inhibits communication of vibration and shock to the processor. Securing the side cover assembly inhibits flexion of the housing 12.

Although the contoured portion 82 of the foam pad 80 is designed having a rectangular shape to press against the processor assembly 44, it can be appreciated that the contoured portion can be specifically designed to press against any of a variety of electronic components including memory chips, daughter boards and cards.

Figure 7:
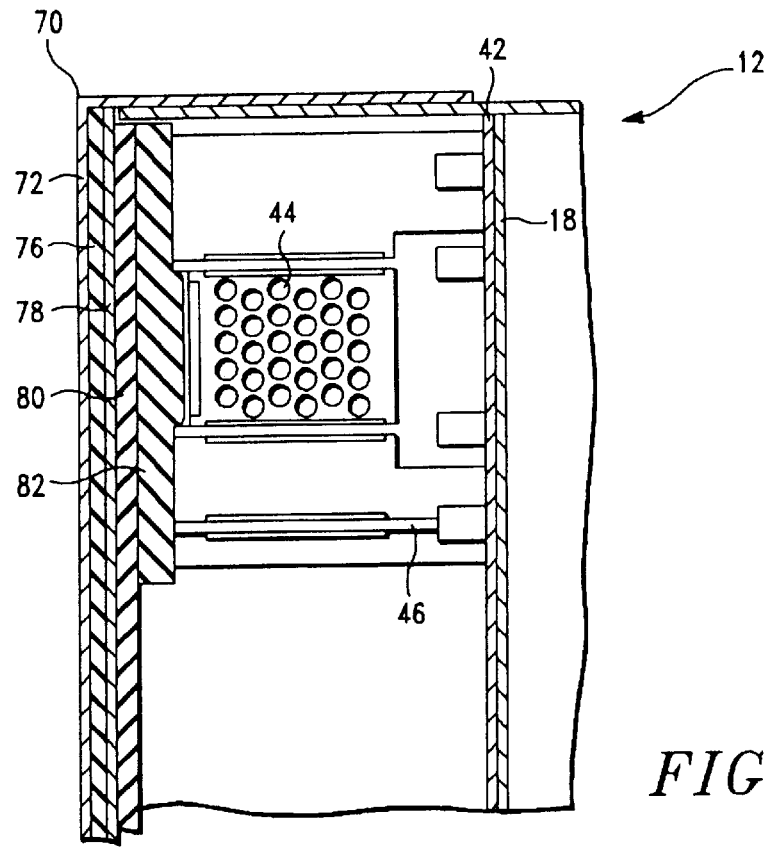
FIG. 7 is a side view of the mainboard section of the computer housing of FIG. 1.

FIG. 7 is a side view of a portion of the housing 12 where the side cover assembly 70 presses against the processor assembly 44 and a card 46. The outer cover 72 presses against the gasket 76, which presses against the inner member 78 which, in turn, presses against the foam pad 80, which presses against electronic components including the processor unit 44 and the card 46, which press into the mainboard 42, which presses against the midplane 18.

Accordingly, the side cover assembly 70 compresses the foam pad 80 against the cards 46 to support the mainboard 42 and to enable the cards 46 and the mainboard 42 to internally support the computer housing 12. Holding the cards 46 with the pad 80 enables the mainboard 42, the side cover assembly 70 and the midplane 18 to function as a single unit. The side cover assembly, the mainboard 42 and the midplane 18 function as a composite structure.

The contoured portion 82 of the foam pad 80 presses with relatively greater pressure against the processor assembly 44 than the relatively fragile card 46. This pressure is adjusted by the shape of the contoured portion 82.

The cooperation of the structure: outer cover 72, the gasket 76, the inner member, the foam pad, the electronic components including the processor unit 44 and the card 46, the mainboard 42, and the midplane 18, provides internal rigidity to the computer housing to inhibit flexion of the computer housing 12. This cooperation of structure also dampens vibrations while inhibiting movement of the various electronic components. This cooperation of structure also strengthens the side cover assembly 70 so that the computer housing 12 supports an increased amount of weight.

Figure 8:
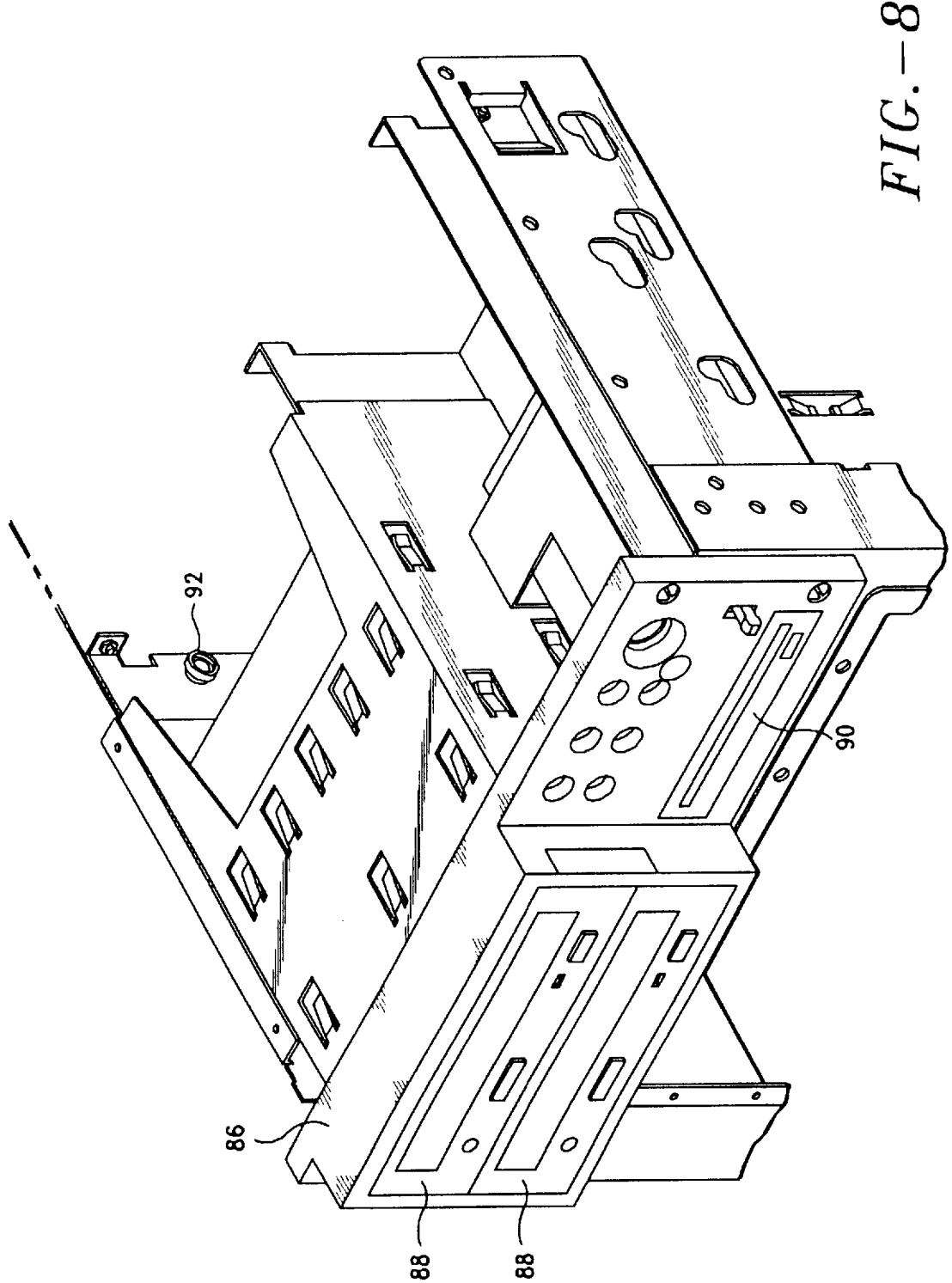
FIG. 8 is a perspective view of a removable media storage unit of FIG. 1.

FIG. 8 is a perspective view of the removable storage media unit 86. The unit 86 includes a pair of optical drives 88 and a floppy drive 90. The unit 86 mounts on resilient spacer mounts 92 to isolate the removable storage media unit from the remainder of the housing 12. Isolation of the removable storage media unit dampens vibrations to minimize damage to the optical drive 88 and floppy drive 90 during impact and vibrations.

FIG. 9a shows multiple memory storage devices 94 which removeably insert into the chassis assembly 16. According to one aspect of the invention, the memory storage devices 94 are hard disk drives. It can be appreciated, however, that virtually any memory storage device type can be used in accordance with the present invention.

FIG. 9b, 9c and 9d show an exploded view of an embodiment of the disk chassis assembly 16. The chassis assembly 16 includes a top 96, a bottom 98 and a suspension mount. The suspension mount includes a pair of isolation mounts 100. The isolation mounts 100 attach to both the top 96 and to the bottom 98.

FIG. 9c and FIG. 9d show top and bottom isolation mounts 100, respectively. The isolation mounts 100 each include a base plate 102, a pair of loose bar mounts 104, a capture bracket 106 and a plurality of high mass load snubbers 108. The base plate 102 supports the pair of loose bar mounts 104 in parallel. The capture bracket 106 holds the loose bar mounts 104 on the base plate and the snubbers 108 support the chassis independently of the loose bar mounts 104. The capture bracket 106 removeably attaches to the base plate 102 to secure the loose bar mounts 104 between the base plate 102 and the capture bracket 106.

Each capture bracket has one side with tabs. The tabs insert into the base plate so that each capture bracket folds over the isolation mount.

The top 96 and bottom 98 of the chassis assembly 16 is formed of sheet metal having a cross-rib to stiffen the top and bottom of the chassis assembly to provide rigidity to the chassis assembly 16 and to dampen vibrations.

Each capture bracket 106 includes an opening which exposes a portion 110 of the loose bar mount 104. The exposed portion 110 contacts the chassis assembly 16. The loose bar mounts 104 are resilient and dampen vibrations between the computer housing and the chassis assembly 16.

The snubbers 108 support the chassis assembly 96 independently of the loose bar mounts 104 and protect the disk chassis against severe impact. According to one aspect of the invention, the chassis assembly 16 has lateral sides 112. Snubbers 108 attach to the lateral sides to protect the memory storage devices 94 against shock due to impact.

Each spacer 110 has a generally trapezoidal cross section so that the spacers are compressible under a variety of loading forces.

FIG. 9d shows the top isolation mount 100. The top Isolation mount 100 attaches via the loose bar mounts 40 the top 96 of the chassis assembly 16. The loose bar mounts 40 suspend the chassis assembly 16 within the housing 12 so that vibrations from the memory storage devices 94 do not pervade the housing 12.

FIG. 10 shows an exploded view of an embodiment of the base assembly 14, including the top face 22, the bottom face 24 and the reinforcing members 30. In this embodiment, the base assembly 14 includes two parallel reinforcing members 30 welded to the bottom face 24. The reinforcing members 30 have an "I" beam cross-section. The box beam 28 has an inner periphery 34. The reinforcing members 30 align with the inner periphery 34. Alignment with the inner periphery of the box beam 28 enables the reinforcing members 30 to define a portion of the box beam 28 and provide rigidity to the base assembly 14. In an alternate embodiment, the reinforcing members 30 align centrally within the box beam 28 and the casters attach directly to the reinforcing members 30.

IN OPERATION

The base assembly 14 supports the housing 12 so that the housing 12 can roll on casters 26 without significantly flexing. Significant flexion of the base assembly 14 and of the housing 12 can cause a mainboard, and/or other electronic components of a computer system to fail. Flexion of the base assembly 14 may also inhibit operation of the casters 26.

The box beam 28 of the base assembly reinforces the base assembly so that the casters 26 may mount directly to the box beam 28. It can be appreciated that the box beam 28 may be modified in a number of ways which will operate to reinforce the base assembly 14 for the casters 26. The box beam functions not only to reinforce the base assembly 14, but also to diffuse forces encountered by the casters 26. Various box beam configurations will accomplish these goals. For example, the box beam 28 of the present invention may be modified or varied to have a trapezoidal, or circular cross-section, instead of the rectangular cross section disclosed.

The chassis assembly 16 is designed primarily to hold rotating and vibrating hard disk drives. The isolation mount 100 dampens shock and vibrations between the base assembly and the chassis assembly 16. These vibrations are normally caused by the disk drives. It can be appreciated, however, that the isolation mount 100 can also protect the disk drives from various frequency vibrations such as those that result when, for example, the casters 26 hit a door jam. Isolating the hard disk drives protects the electronic components in the mainboard side of the housing.

The midplane 18 not only isolates the mainboard section from the chassis assembly 16 and the midplane internally supports the housing in a variety of ways. One way in which the midplane 18 functions is by cooperating with the side cover assembly as a composite structure.

The side cover assembly 70 encloses the chassis assembly and the mainboard section to externally support the housing. The side cover assembly 70 also cooperates with the midplane to internally support the housing. The side cover assembly 70 closes over the housing 12 and presses the electronic components against the midplane 18. Accordingly, the side cover assembly 70, the electronic components and the midplane 18 function as a single structure to internally support the housing 12.

The housing 12 has a side opening for receiving the side cover assembly 70. The gasket 76 of the side cover assembly 70 is fabricated from sponge urethane rubber and the rigid inner member 78 is fabricated from sheet metal. The rigid inner member 78 provides rigidity to the side cover assembly 70 to enable the side cover assembly 70 to press fit against the housing 12 and cover the side opening.

While the foregoing has described a specific embodiment of the invention, there are many variations which should be apparent. For example, the housing can be particularly adapted in various shapes and configurations to house components other than those shown herein. Additionally, the cooperation between elements which create and outer shell and inner support to the housing can manifest themselves in any number of configurations. These and other variations are intended to be within the scope of the invention which is limited only by the claims below.

We claim:

1. A rugged housing for protecting electronic components, comprising:

a base assembly for supporting the housing, the base assembly includes casters, a top face and a bottom face which form a box beam, the box beam reinforces the base assembly so that the base assembly may be rolled on the casters;

a chassis assembly mounted on the base assembly, the chassis assembly includes an isolation mount which attaches the chassis assembly to the base assembly, the isolation mount dampens shock and vibrations between the base assembly and the chassis assembly;

a midplane attached to the base assembly, the midplane defines a mainboard section and isolates the mainboard section from the chassis assembly, the midplane internally supports the housing; and a side cover assembly mounted on the base for enclosing the chassis assembly and the mainboard section, the side cover assembly includes an outer cover, a gasket, and a rigid inner member which cooperate to externally support the housing, the side cover assembly presses electronic components against the midplane to internally support the housing.

2. A housing as set forth in claim 1, wherein the housing has a side opening for receiving the side cover assembly, the gasket is fabricated from sponge urethane rubber and the rigid inner member is fabricated from sheet metal, the rigid inner member provides rigidity to the side cover assembly to enable the side cover to press fit against the housing and cover the side opening.

3. A housing as set forth in claim 1, wherein the isolation mount includes a base plate, a pair of loose bar mounts, a capture bracket and a plurality of high mass load snubbers, the base plate supports the pair of loose bar mounts in parallel, the capture bracket holds the loose bar mounts on the base plate and the snubbers support the chassis independently of the loose bar mounts.

4. A housing as set forth in claim 1, wherein the side cover assembly includes a pad attached to the inner member, the main board section includes a mainboard with cards and a processor unit, the outer cover seals the gasket against the housing and presses the pad against at least a portion of the mainboard assembly.

5. A housing as set forth in claim 4, wherein the pad presses against the processor unit.

6. A housing as set forth in claim 4, wherein the pad includes a contoured portion, the contoured portion presses against the processor unit.

7. A housing as set forth in claim 4, the pad presses against the cards to inhibit vibration of the cards and to press the cards and the mainboard into the midplane to enable the cards and the mainboard to add structural support to the housing.

* * * * *